(12) United States Patent
Jin et al.

(10) Patent No.: US 7,239,367 B2
(45) Date of Patent: Jul. 3, 2007

(54) TILED DISPLAY DEVICE WITH BLACK MATRIX FILM HAVING DIFFERENT APERTURE RATIOS

(75) Inventors: Hyun Suk Jin, Gyeonggi-Do (KR); Min Joo Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 69 days.

(21) Appl. No.: 11/169,294

(22) Filed: Jun. 29, 2005

(65) Prior Publication Data
US 2006/0012733 A1 Jan. 19, 2006

(30) Foreign Application Priority Data
Jun. 30, 2004 (KR) ............... 10-2004-0050854

(51) Int. Cl.
*G02F 1/133* (2006.01)
*G09G 5/00* (2006.01)
*G02B 6/08* (2006.01)

(52) U.S. Cl. ............... 349/159; 349/58; 349/73; 349/110; 349/160; 345/1.3; 385/120

(58) Field of Classification Search ............... 349/73
See application file for complete search history.

(56) References Cited

U.S. PATENT DOCUMENTS

| 4,980,755 | A | | 12/1990 | Ozaki |
|---|---|---|---|---|
| 5,067,021 | A | | 11/1991 | Brody |
| 5,068,740 | A | | 11/1991 | Brody |
| 5,079,636 | A | | 1/1992 | Brody |
| 5,838,405 | A | * | 11/1998 | Izumi et al. ............... 349/73 |
| 5,926,239 | A | * | 7/1999 | Kumar et al. ............... 349/69 |
| 5,928,819 | A | * | 7/1999 | Crawford et al. ............ 430/20 |
| 6,487,351 | B1 | * | 11/2002 | Cryan et al. ............... 385/120 |
| 6,873,380 | B2 | * | 3/2005 | Matthies et al. ............ 349/67 |
| 2002/0031316 | A1 | * | 3/2002 | Lowry ............... 385/120 |
| 2002/0122642 | A1 | * | 9/2002 | Kijima ............... 385/120 |
| 2004/0008155 | A1 | * | 1/2004 | Cok ............... 345/1.3 |
| 2004/0201558 | A1 | * | 10/2004 | Arnold et al. ............... 345/83 |

* cited by examiner

*Primary Examiner*—Andrew Schechter
*Assistant Examiner*—Lauren Nguyen
(74) *Attorney, Agent, or Firm*—Morgan, Lewis & Bockius LLP

(57) ABSTRACT

A tiled display device is disclosed. The disclosed tiled display device includes a plurality of display panels each having an image display part in which a plurality of pixels are formed. The tiled display device includes a support frame having a plurality of panel receiving portions such that the plurality of display panels are tiled side by side and received therein. The tiled display device also includes a plurality of light guides each formed of an optical fiber bundle and disposed on the corresponding display panel, each light guide having an image receiving surface and a display surface that have different surface areas from each other, wherein a light and an image transmitted from the image display part are received by the image receiving surface and are reproduced on the display surface. In addition, the tiled display device includes a black matrix film provided on the display panel and having apertures and a light shielding portion to prevent the light from being leaked to a dead zone between optical fibers in the optical fiber bundle.

27 Claims, 8 Drawing Sheets

TILED DISPLAY DEVICE WITH BLACK MATRIX FILM HAVING DIFFERENT APERTURE RATIOS

This application claims the benefit of the Korean Application No. 50854/2004, filed Jun. 30, 2004, which is hereby incorporated by reference.

BACKGROUND OF THE INVENTION

1. Field of the Invention

The present invention relates to a display device, and more particularly, to a tiled display.

2. Background of the Related Art

As visual information transmitting devices become increasingly important, the scope of an electronic display device industry is being enlarged. The demand for a liquid crystal display (LCD) device, one of the electronic display devices, which is desirably thin and light and consumes small power, is rapidly increasing. Also, with the improved standard of living of consumers, a product having a larger size and better image quality is in more demand.

However, the LCD device has a limit in implementing a large screen by enlarging a size of a liquid crystal panel itself because of its own characteristics. Thus, what is called a projection TV having an optical system with a small liquid crystal panel and implementing a large image by magnifying and projecting an image on the screen has emerged. Recently, a tiled liquid crystal display device in which several liquid crystal devices are tiled side by side to form a large size display device is being put to practical use.

As disclosed in U.S. Pat. Nos. 4,980,755, 5,067,021, 5,068,740 and 5,079,636, the tiled LCD device is fabricated by tiling at least two liquid crystal panels side by side. A key to fabricating such a tiled LCD device is to prevent boundary lines between a plurality of liquid crystal display devices from being displayed on a screen.

FIG. 1 is a schematic construction view which illustrates a related art tiled display device. The tiled display device 10 is formed by fixing a plurality of display panels 30a-30d to a frame 20. The frame includes an outer wall frame 20a forming an outer wall, a partition wall frame 20b interposed between the plurality of display panels 30a-30d, and a bottom plate 20c which the display panels 30a-30d are placed on. Here, each of the display panels 30a-30d is received in a space formed by the partition wall frame 20b and the outer wall frame 20a and is tiled.

However, in a large screen formed through the aforementioned tiling technology, because an image is not formed at an area of the support frame 20, a seam phenomenon (artificial boundary) occurs in that a boundary line is displayed on the screen corresponding to the support frame 20, including the partition wall frame 20b. Thus, an entirely-unified image cannot be displayed.

Accordingly, in order to prevent a seam line from being displayed at a seam area between display devices, namely, at a partition wall frame area, a method of guiding light emitted from the display panels and thus extending a path of the light up to an upper portion of the partition wall frame has been proposed. Here, one of light guides introduced for light diffusion is an optical fiber bundle.

The optical fiber bundle includes an image receiving surface receiving a light source and an image, and a display surface reproducing the received light source and image on a screen of the tiled display device. The light source and the image are magnified by using a difference in distribution density of optical fibers on the image receiving surface and the display surface. Namely, as the display surface has a wider area than that of the image receiving surface to make the optical fiber distribution density on the display surface smaller than that on the image receiving surface, an area of a dead zone between the optical fibers is increased. Accordingly, a light source and an image are magnified and displayed.

However, in the optical fiber bundle that magnifies a light source and an image in the aforementioned manner, because the display surface has a sectional area wider than that of the image receiving surface, optical fibers disposed at a region adjacent to an outer inclined surface are inclined at an angle greater than that at which optical fibers disposed at a central portion are inclined. For this reason, a dead zone between optical fibers on an edge portion becomes wider than that at a central portion.

Accordingly, the brightness of an image transmitted to the edge portion of the optical fiber bundle becomes lower than that of an image transmitted to its central portion, which causes the brightness of an image implemented on a seam area to be different from the average brightness of an entire image. Therefore, a method for achieving uniform brightness distribution over an entire screen of the tiled display device is required.

SUMMARY OF THE INVENTION

Accordingly, the present invention is directed to a tiled display device that substantially obviates one or more of the problems due to limitations and disadvantages of the related art.

An object of the present invention is to prevent or decrease visible distinction between a seam area (artificial boundary) and the rest of the area by providing each display device with an appropriate compensation device for preventing seam phenomena occurring due to a structural anomaly of a tiled display device. Namely, variations in brightness and chromaticity occurring at the seam area are corrected or alleviated for several pixels, thereby preventing or decreasing visual observation of a seam line. Such compensation is individually performed on each of display panels.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a tiled display device includes: a plurality of display panels each having an image display part in which a plurality of pixels are formed; a support frame having a plurality of panel receiving portions such that the plurality of display panels are tiled side by side and received therein; a plurality of light guides each formed of an optical fiber bundle and disposed on the corresponding display panel, each light guide having an image receiving surface and a display surface that have different surface areas from each other, wherein a light and an image transmitted from the image display part are received by the image receiving surface and are reproduced on the display surface; and a black matrix film provided on the display panel and having apertures and a light shielding portion to prevent the light from being leaked to a dead zone between optical fibers in the optical fiber bundle.

In another aspect of the present invention, a tiled display device includes: a plurality of display panels each having an image display part in which a plurality of pixels are formed, wherein each pixel includes 4-color sub-pixels and a black matrix formed in a matrix along boundaries of the sub pixels; a support frame having a plurality of panel receiving portions such that the plurality of display panels are tiled side by side and received therein; a plurality of light guides formed of an optical fiber bundle and disposed on the corresponding display panel, each light guide having an image receiving surface and a display surface that have different surface areas from each other, wherein a light and an image transmitted from the image display part are received by the image receiving surface and are reproduced on the display surface; and a black matrix film provided on the display panel and having circular apertures and a light shielding portion to prevent the light from being leaked to a dead zone between optical fibers in the optical fiber bundle, wherein the image display part of the display panel is divided into a plurality of regions, and aperture ratios of the pixels are varied according to the divided regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
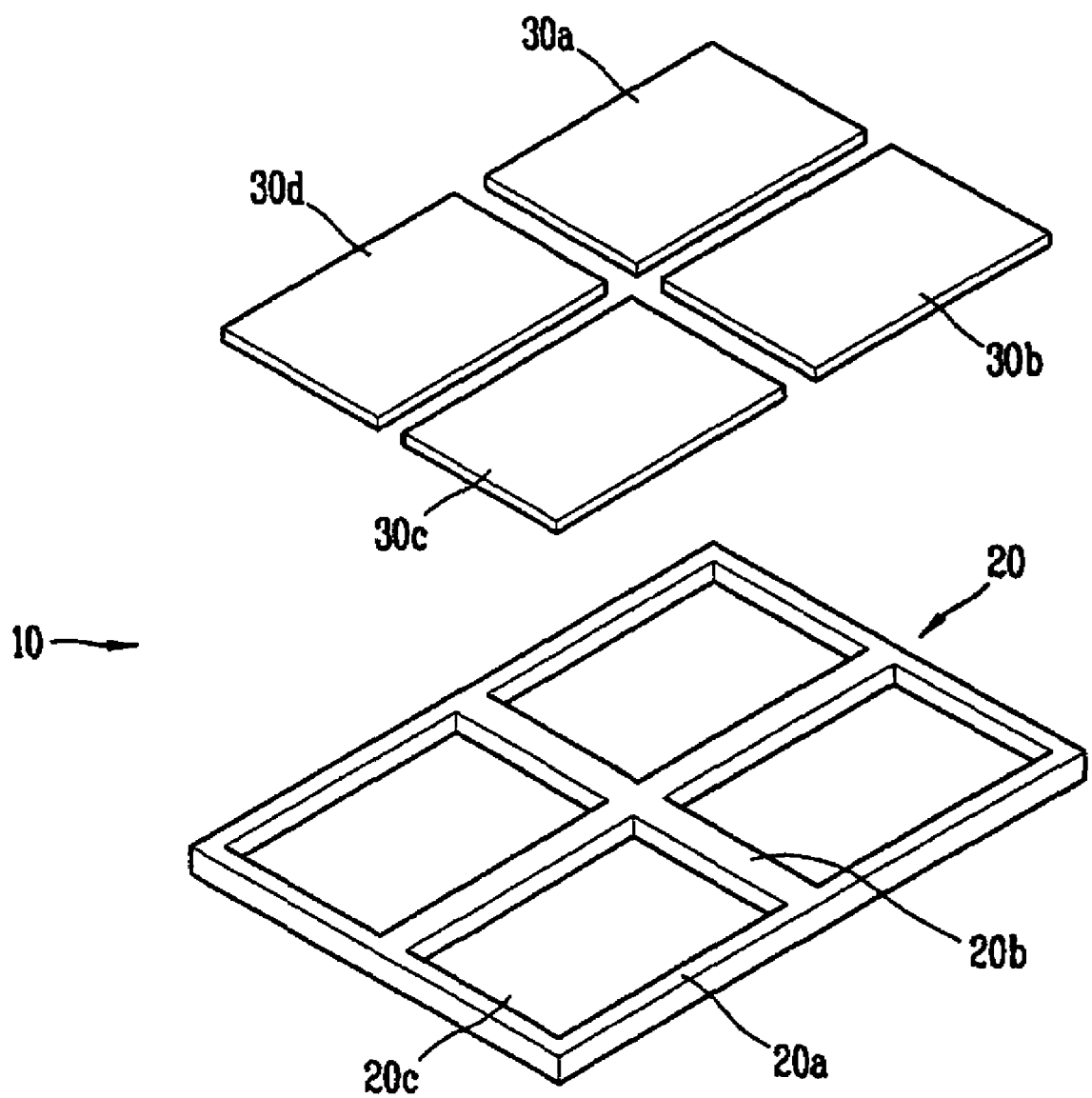
FIG. 1 is a construction view which illustrates a tiled display device in accordance with the related art.
Figure 2A:
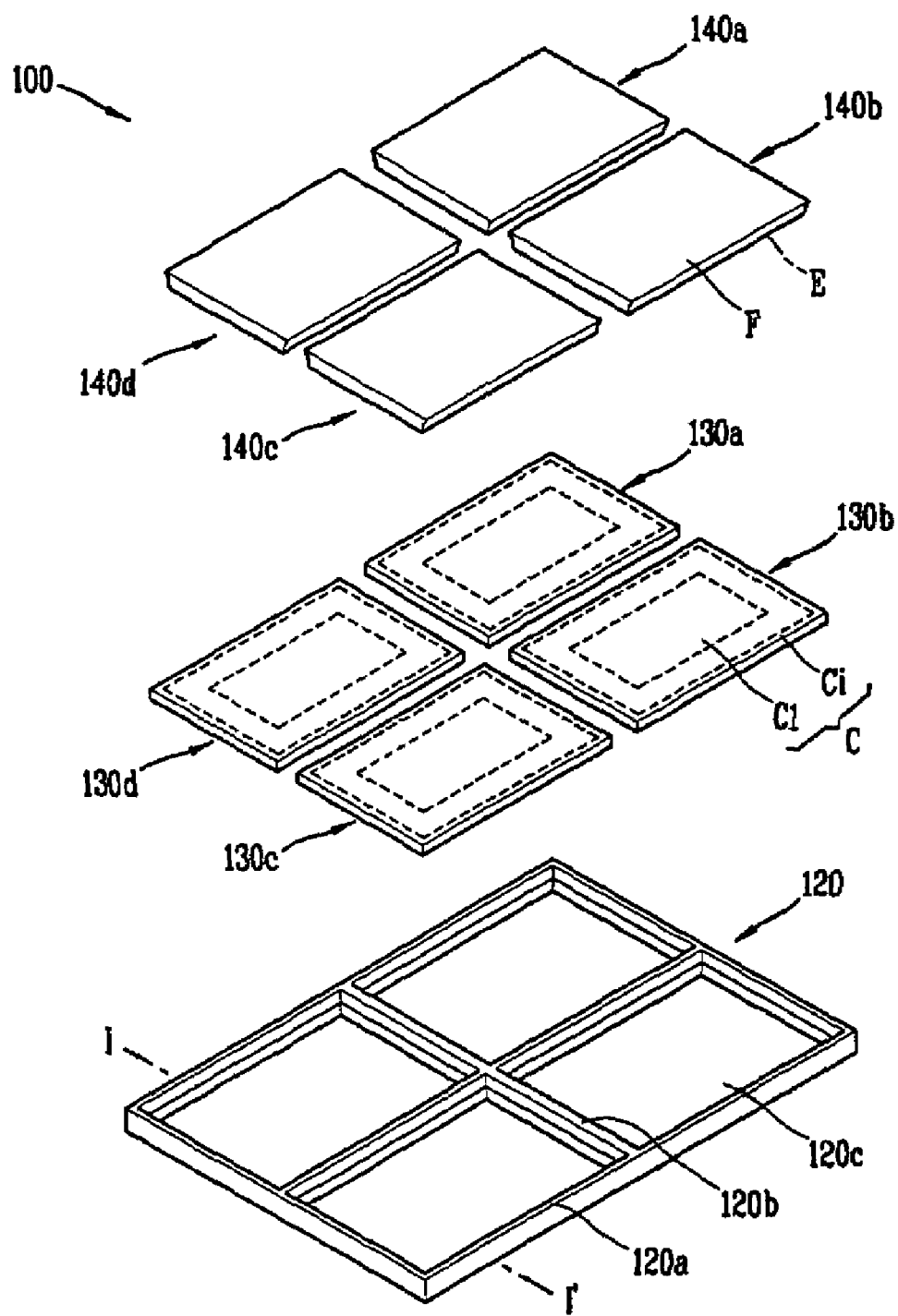
FIG. 2A is a construction view which illustrates a large tiled display device in accordance with a first exemplary embodiment of the present invention.

FIG. 2A is a schematic exploded perspective view which illustrates a tiled display device in accordance with a first exemplary embodiment of the present invention. As shown, the tiled display device 100 in accordance with the present invention is formed such that a plurality of display panels 130a-130d individually having light guides 140a-140d thereon are tiled and fixed side by side by a support frame 120.

The support frame 120 includes an outer wall frame 120a forming an outer wall, a partition wall frame 120b interposed between display panels, and a bottom plate 120c which the light guides 140a-140d and the display panels 130a-130d are placed on. Each of the display panels 130a-130d is received within a space formed by the partition wall 120b and the outer wall frame 120a.

A plurality of pixels are formed at each of the display panels 130a-130d to thereby define an image display part C. The image display part C is divided into a plurality of regions C1-Ci, where i is an integer equal to or greater than 2, from its center to a spot where an inclined surface is started in four directions. The image display part C having the divided regions C1-Ci includes pixels having aperture ratios increasing toward an edge region Ci from a central region C1, thereby making the brightness of an image transmitted to the edge region Ci higher than that at the central region C1 of each of the display panels 130a-130d.

The light guides 140a-140d are optical fiber bundles 140a-140d. One of the optical fiber bundles 140a-140d is disposed on the corresponding one of the display panels 130a-130d. For example, an image receiving surface E contacting the display panel 130b and receiving a light source and an image from the display panel 130b is formed at one surface of the optical fiber bundle 140b, and a display surface F reproducing the light source and the image on a screen of the tiled display device is formed at the other surface of the optical fiber bundle 140b. The display surface F has a greater surface area than the image receiving surface E, thereby magnifying the light source and the image received by the image receiving surface E.

Figure 2B:
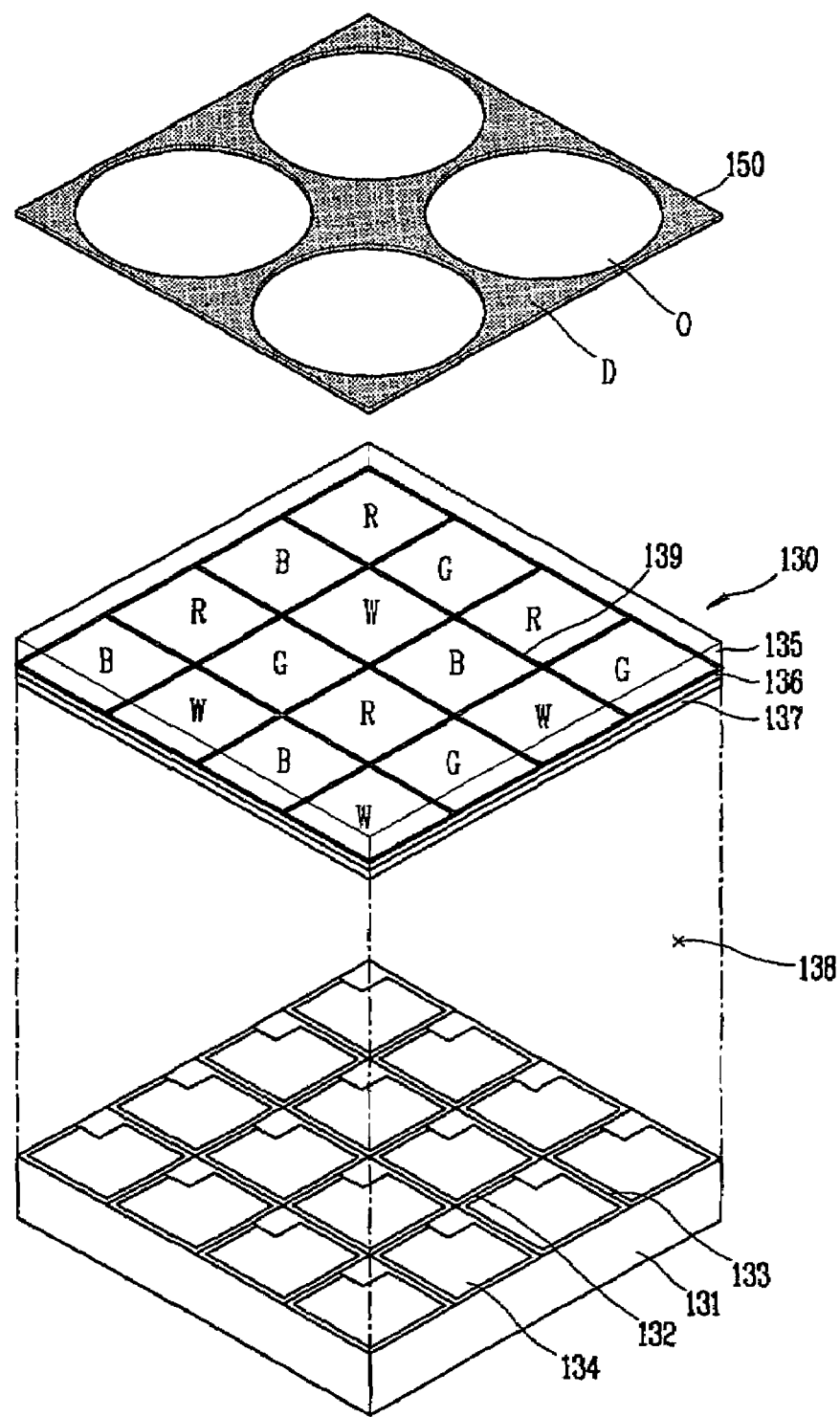
FIG. 2B is a construction view which illustrates a liquid crystal panel in accordance with the first exemplary embodiment of the present invention.

Here, the display panels 130a-130d are liquid crystal panels. As shown in FIG. 2B, each display panel 130 includes a first substrate 131 which is a thin film transistor array substrate, a second substrate 135 which is a color filter substrate, and a liquid crystal layer 138 formed between the first and second substrates 131 and 135. A plurality of gate lines 133 and a plurality of data lines 132 intersect on the first substrate 131 to define sub-pixels, and a thin film transistor (not shown) is formed at each intersection of the gate lines 133 and the data lines 132 and switches each sub-pixel n or off. A pixel electrode 134 for driving a liquid crystal material of the liquid crystal layer 138 is formed within each sub-pixel. R(red), G(green), B(blue), and W(white) color filters 136, or R(red), G(green), B(blue), and Y(yellow) color filters 136 are disposed on the second substrate 135, corresponding one to one to sub-pixels on the first substrate 131. A black matrix 139 is formed on the second substrate 135 at a boundary region between the sub-pixels in a matrix form so as to prevent light leakage to the upper portion of the boundary region. A common electrode 137 for driving liquid crystal molecules by generating an electric field together with the pixel electrode 134 is formed on the color filters 136.

A black matrix film 150 including circular apertures O and a light shielding portion D is disposed on each liquid crystal panel 130. Each aperture O corresponds to one optical fiber (not shown) having a circular section and transmits to the optical fiber an image displayed through the image display part of the liquid crystal panel. The shielding portion D prevents light from being leaked onto a dead zone existing between a plurality of optical fibers constituting an optical fiber bundle. Here, one aperture O is disposed corresponding to one unit pixel on the liquid crystal panel, and the unit pixel includes a group of sub-pixels 160a-160d of R, G, B, and W (or R, G, B, and Y), which are arranged in 2×2 quad form.

Figure 2C:
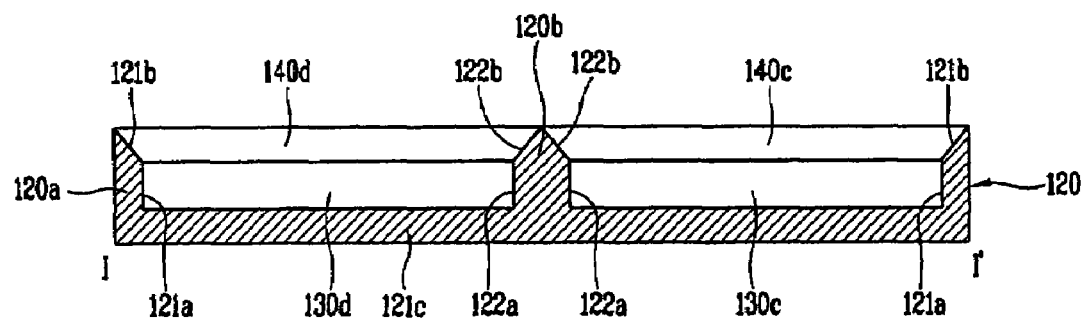
FIG. 2C is a sectional view taken along line I-I' of FIG. 2A.

FIG. 2C is a sectional view taken along line I-I' of FIG. 2A and illustrates a cross sectional view of the tiled display device in accordance with the first exemplary embodiment of the present invention. As shown, an inner side of the outer wall frame 120a includes vertical surfaces 121a corresponding to side portions of the display panels 130c and 130d, and inclined surfaces 121b upwardly extending from the vertical surfaces 121a and corresponding to outer inclined surfaces of optical fiber bundles 140c and 140d. The inclined surfaces 121b are formed inclined such that a thickness of the outer wall frame 120a gets narrower in an upward direction. The inclined surfaces 121b accordingly correspond to the outer inclined surfaces of the optical fiber bundles 140c and 140d. Also, vertical surfaces 122a are formed at both sides of the partition wall frame 120b to a certain height, and inclined surfaces 122b are formed upwardly extending from the vertical surfaces 122a to correspond to outer inclined surfaces of the optical fiber bundles 140c and 140d. Here, each of the inclined surfaces 122b is inclined such that the partition wall frame 120b gets narrower in an upward direction. Accordingly, the inclined surfaces 122b correspond to the outer inclined surfaces of the optical fiber bundles 140c and 140d.

Figure 2D:
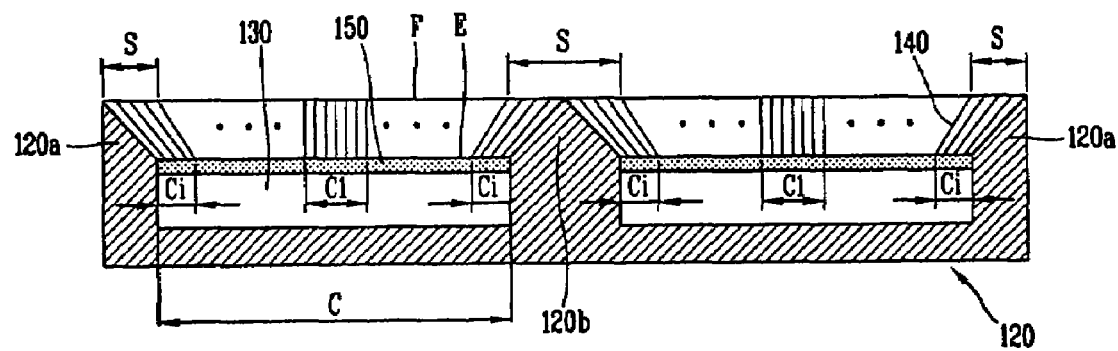
FIG. 2D is a sectional view which illustrates an optical guide in accordance with the first exemplary embodiment of the present invention in detail.

FIG. 2D is a view which illustrates the optical fiber bundle 140 and the display panel 130 fixed by the support frame 120 of FIG. 2C in more detail. As shown, a display surface F of the optical fiber bundle 140 has a surface area greater than that of an image receiving surface E. For this reason, the optical fibers disposed at a region adjacent to the outer inclined surface are inclined in a direction of the outer inclined surface at an angle greater than that at which optical fibers disposed at a central region are inclined. Thus, an image can be magnified and displayed over a seam area (artificial boundary region) generated by a partition wall frame 120b or an outer wall frame 120a dividing display panels 130. Namely, as a distribution density of optical fibers on the display surface F becomes lower than that on the image receiving surface E, an area of a dead zone between the optical fibers increases. Accordingly, a light source and an image are magnified and displayed.

However, if the image is magnified only by the distribution density of the optical fiber bundle 140 as described above, the brightness of an image transmitted to an edge region corresponding to a seam area S becomes lower than that of the image transmitted onto the image display part C of the optical fiber bundle 140. Consequently, a problem may occur in that the brightness of an image implemented on the seam area S becomes different from the average brightness of the entire image. In other words, an image reproduced on the edge region of a screen corresponding to the seam area S of the tiled display device has a lower brightness than that of an image reproduced at a region C of the display.

In order to solve such problems, in the exemplary embodiments of the present invention, an image display part C of a display panel 130 is divided into a plurality of regions C1-Ci, where i≧2, from the center to a spot where an inclined surface is started in four directions. A ratio of an actual emissive surface to an entire surface area of a corresponding pixel, namely, an aperture ratio of the display, is adjusted according to the divided regions such that the brightness of an image of a pixel is varied by each region of the display panel, thereby improving the uniformity of the brightness throughout the entire tiled display device. In other words, by making aperture ratios of pixels corresponding to an edge region Ci greater than those of pixels corresponding to a central region C1 of the image display part C, a more uniform brightness of an entire image displayed on a screen of the tiled display device can be achieved.

Accordingly, in the exemplary embodiments of the present invention, a black matrix film 150 having apertures with different areas according to different regions is provided on each display panel 130, thereby controlling an aperture ratio of pixels.

Figure 3:
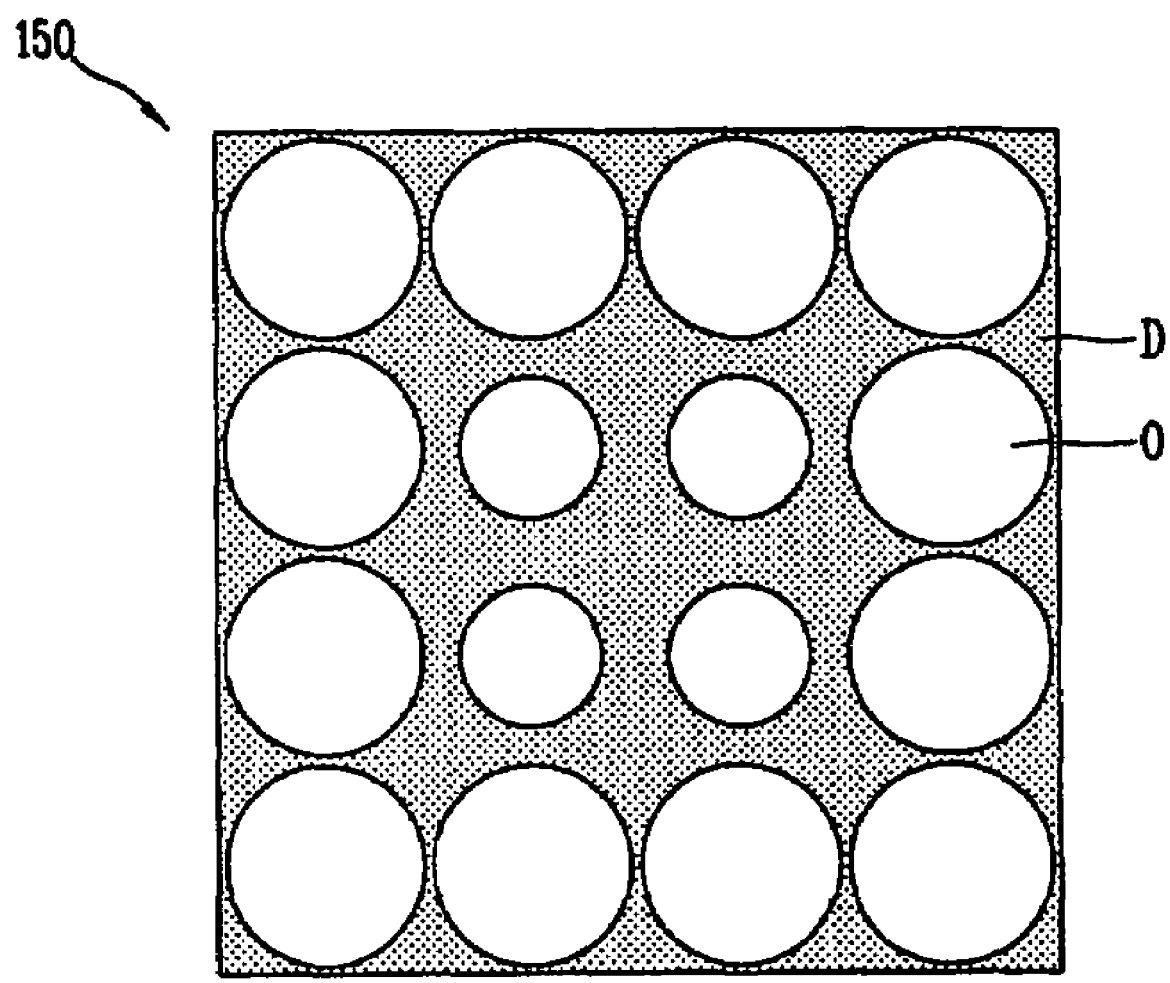
FIG. 3 is a plan view which illustrates a black matrix film in accordance with a second exemplary embodiment of the present invention.

FIG. 3 is a front view of a black matrix film 150 provided on each display panel according to a second exemplary embodiment of the present invention. The black matrix film 150 includes circular apertures O corresponding in a 1:1 ratio to optical fibers, and a light shielding portion D preventing light leakage onto a dead zone between the optical fibers from occurring. Here, the circular apertures O have different sizes according to their positions on the black matrix film 150, thereby varying aperture ratios of corresponding pixels in each divided region on the display panel.

Apertures O are formed such that their sizes are increased toward an edge region of the black matrix film 150 and reduced toward a central region. Accordingly, aperture ratios of pixels corresponding to the edge region of the black matrix film 150 are increased while aperture ratios of pixels corresponding to the central region are reduced. Thus, the brightness of an image reproduced on an entire screen of the tiled display device becomes more uniform.

Figure 4A:
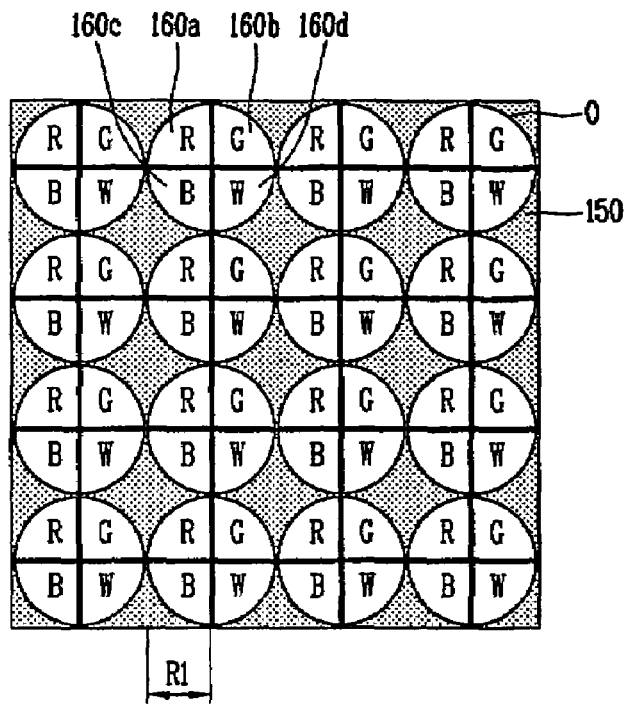
FIGS. 4A and 4B are plan views which illustrate the tiled display device in accordance with a third exemplary embodiment of the present invention.
Figure 4B:
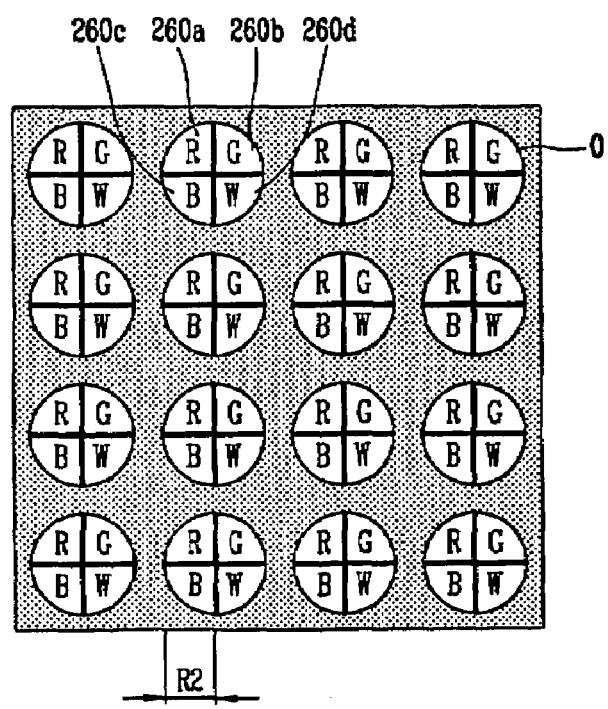

FIGS. 4A and 4B are front views of the black matrix film respectively illustrating an edge region and a central region of a light source display part according to a third exemplary embodiment of the present invention, which are viewed from a front surface of a light guide formed of an optical fiber bundle. As shown, circular apertures O of the black matrix film 150 are formed to have different radii, R1 and R2, according to regions of the image display part, i.e., edge region or central region, thereby varying aperture ratios of pixels disposed thereunder.

The radius R1 of the circular aperture O of the black matrix 150 disposed on a unit pixel, including R, G, B, and W sub-pixels 160a-160d arranged in a 2×2 quad form, at an edge region of the image display art in FIG. 4A is greater than the radius R2 of the circular aperture O disposed on a unit pixel at a central region of the image display part in FIG. 4B, thereby increasing an aperture size of the unit pixel of the edge region.

Consequently, as a pixel having a small aperture ratio by reducing the radius R2 of the circular aperture O is formed at a central region of the display panel, the brightness of the central region of the display panel becomes lower than that of the edge region, thereby compensating for variation in brightness. Here, the circular apertures O are designed to have radii increasing from the central region toward the edge region according to the number of regions set at the display panel.

Figure 5A:
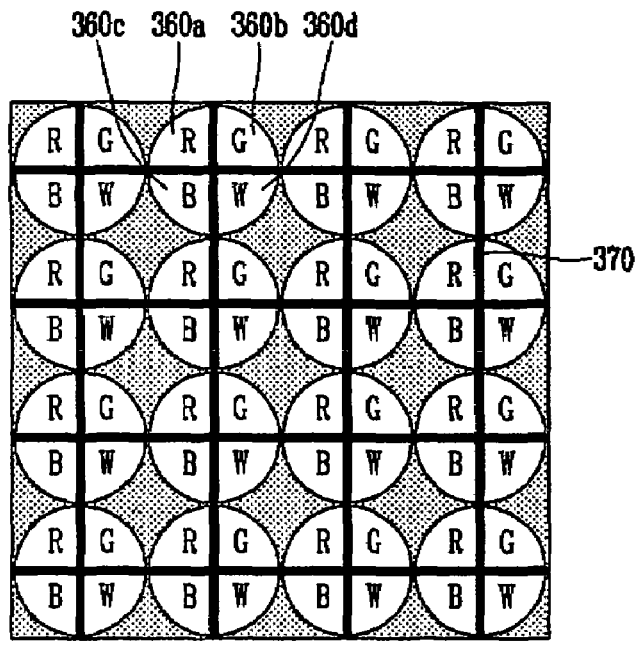
FIGS. 5A and 5B are plan views which illustrate the tied display devices in accordance with fourth and fifth exemplary embodiments, respectively, of the present invention.
Figure 5B:
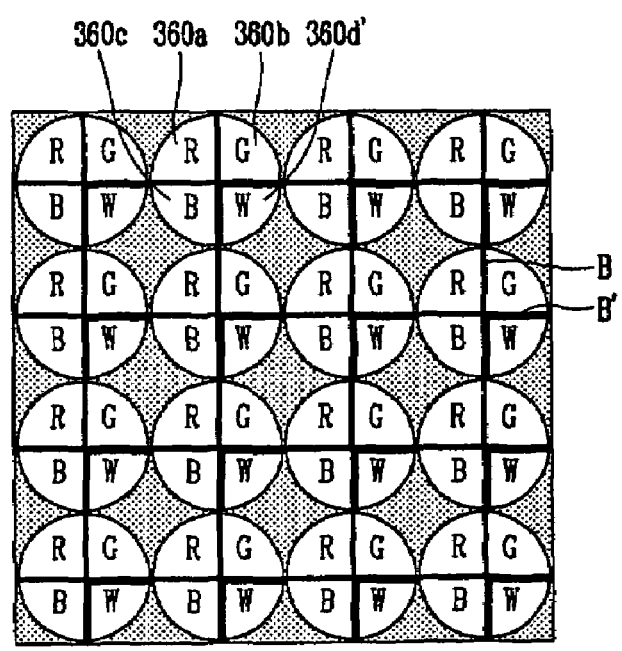

FIGS. 5A and 5B show fourth and fifth exemplary embodiments of the present invention that reduces an aperture ratio of a pixel placed at a central region of the display panel by the aforementioned principle. First, in FIG. 5A, a width of a black matrix 370 setting boundaries between R, G, B, and W sub-pixels 360a-360d is varied according to the position of pixels on a display panel, thereby controlling the aperture ratio of the pixel. Namely, the black matrix 370 of the pixel placed at the center region of the display panel has a width wider than that of the black matrix 370 placed at the edge region, to thereby lower the brightness of an image transmitted through the pixel of the central region. In such a manner, the compensation for brightness variation is made.

FIG. 5B shows an example in which only aperture sizes of W sub-pixels 360d', which affect the brightness of a pixel the most in a structure of R, G, B, and W sub-pixels 360a-360d', are varied according to regions of the display panel. Namely, only a width of the portion B' of the entire black matrix B, which sets boundaries between the W sub-pixel 360d' and the G sub-pixel 360b and between the W sub-pixel 360d' and the B sub-pixel 360c, is wider or narrower than that of the rest of the matrix, thereby determining brightness at the corresponding region. The brightness of the pixel placed at the central region of the display panel and the brightness of a pixel placed at the edge region are controlled in the aforementioned manner, thereby maintaining brightness and intensity of light reproduced over an entire surface of a large screen part of the tiled display device more uniform.

Figure 6:
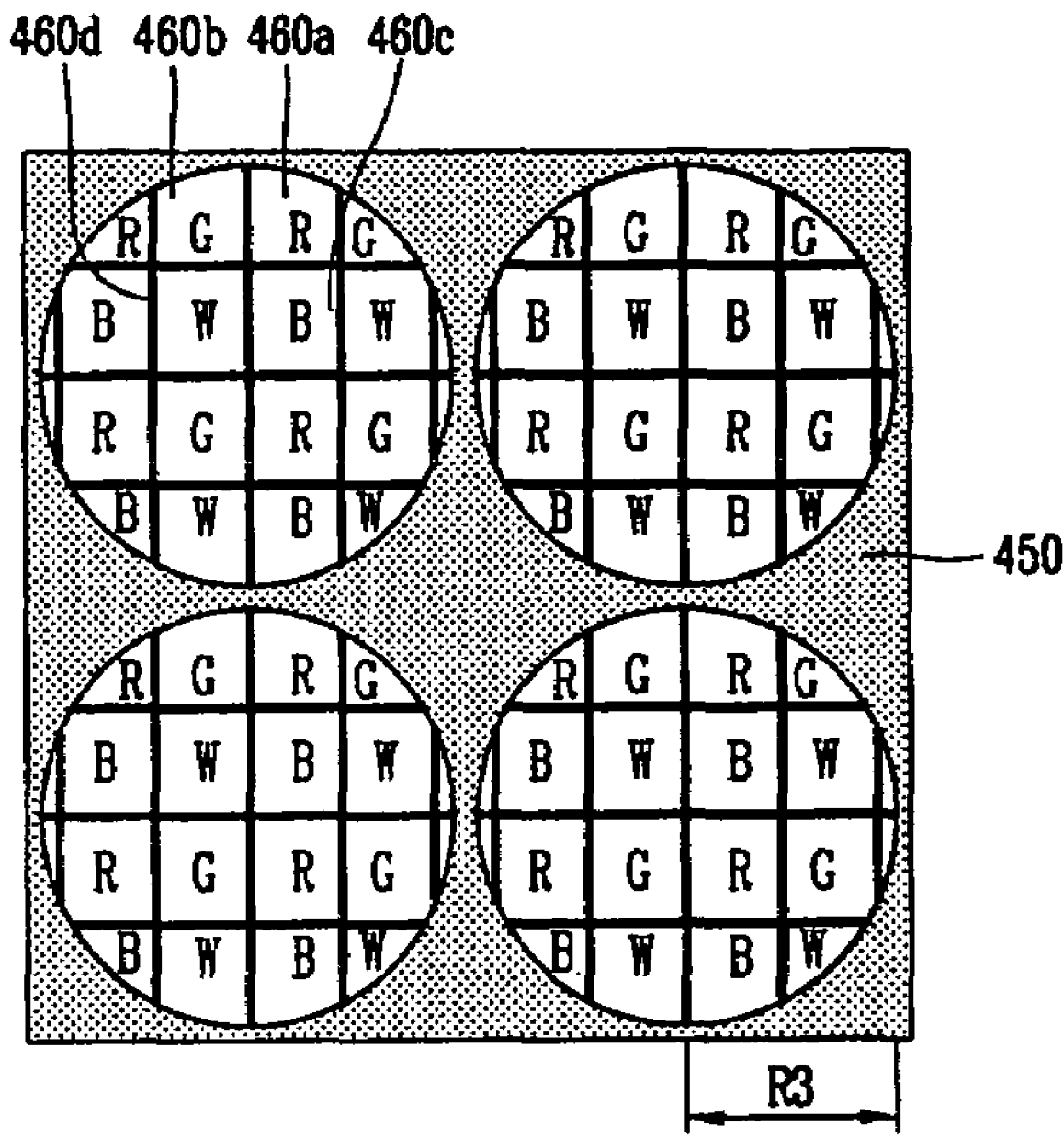
FIG. 6 is a plan view which illustrates the tiled display device in accordance with a sixth exemplary embodiment of the present invention.

FIG. 6 is a sixth exemplary embodiment in which four pixels correspond to one optical fiber. Thus, a total of sixteen R, G, B and W sub-pixels 460a-460d correspond to one optical fiber. In such a structure, an area ratio of the R, G, B, and W sub-pixels 460a-460d opened by one circular aperture within the black matrix film 450 is 1:1:1:1, and thus, there is no color variation within a pixel group. Like the second and third exemplary embodiments of the present invention, in the sixth exemplary embodiment, radii R3 of circular apertures within the black matrix film 450 are adjusted to control the brightness by each region of the display panel.

Accordingly, in order to overcome such non-uniform brightness, a ratio of an actual emissive surface of the pixel with respect to an entire surface area of a unit pixel, namely, an aperture ratio of the display, is adjusted according to regions of the image display part. Thus, the brightness of an image is varied according to regions, thereby maintaining the brightness of the tiled display device more uniform throughout the entire region.

In the aforementioned embodiments, a display panel in accordance with the present invention is a TN mode liquid crystal panel. However, the display panel may be an IPS (in-plane switching) mode liquid crystal panel in which a common electrode 137 and a pixel electrode 134 are formed on the same plane.

It will be apparent to those skilled in the art that various modifications and variations can be made in the tiled display device according to the present invention without departing from the spirit or scope of the invention. Thus, it is intended that the present invention cover the modifications and variations of this invention provided they come within the scope of the appended claims and their equivalents.

What is claimed is:

1. A tiled display device, comprising:
   a plurality of display panels each having an image display part in which a plurality of pixels are formed;
   a support frame having a plurality of panel receiving portions such that the plurality of display panels are tiled side by side and received therein;
   a plurality of light guides each formed of an optical fiber bundle and disposed on the corresponding display panel, each light guide having an image receiving surface and a display surface that have different surface areas from each other, wherein a light and an image transmitted from the image display part are received by the image receiving surface and are reproduced on the display surface; and
   a black matrix film provided on the display panel and having apertures and a light shielding portion to prevent the light from being leaked to a dead zone between optical fibers in the optical fiber bundle,
   wherein the image display part of the display panel is divided into a plurality of regions, and apeture ratios of the pixels are varied according to the divided regions.

2. The device according to claim 1, wherein each of the optical fibers in the optical fiber bundle corresponds to at least one of the pixels.

3. The device according to claim 1, wherein a surface area of the display surface is greater than that of the image receiving surface.

4. The device according to claim 1, wherein each of the pixels includes a plurality of sub-pixels and a black matrix formed in a matrix along boundaries of the sub-pixels.

5. The device according to claim 4, wherein the plurality of sub-pixels includes 4-color sub-pixels.

6. The device according to claim 5, wherein the 4-color sub-pixels are arranged in a 2×2 quad form, wherein the first sub pixel is an R (red) sub-pixel, the second sub-pixel is a G (green) sub-pixel, the third sub-pixel is a B (blue) sub-pixel, and the fourth sub-pixel is one of a W (white) sub-pixel or a Y (yellow) sub-pixel.

7. The device according to claim 1, wherein the apertures are circular.

8. The device according to claim 1, wherein the plurality of regions include a central region and an edge region, and an aperture ratio of the pixels in the central region is smaller than an aperture ratio of the pixels in the edge region.

9. The device according to claim 1, wherein the aperture ratio of the pixels in the image display part is the smallest at the central region and gradually increases toward the edge region.

10. The device according to claim 1, wherein the display panel is a liquid crystal panel.

11. A tiled display device, comprising:
    a plurality of display panels each having an image display part in which a plurality of pixels are formed, wherein each pixel includes 4-color sub-pixels and a black matrix formed in a matrix along boundaries of the sub pixels;
    a support frame having a plurality of panel receiving portions such that the plurality of display panels are tiled side by side and received therein;
    a plurality of light guides formed of an optical fiber bundle and disposed on the corresponding display panel, each light guide having an image receiving surface and a display surface that have different surface areas from each other, wherein a light and an image transmitted from the image display part are received by the image receiving surface and are reproduced on the display surface; and
    a black matrix film provided on the display panel and having circular apertures and a light shielding portion to prevent the light from being leaked to a dead zone between optical fibers in the optical fiber bundle,
    wherein the image display part of the display panel is divided into a plurality of regions, and aperture ratios of the pixels are varied according to the divided regions.

12. The device according to claim 11, wherein each of the optical fibers in the optical fiber bundle corresponds to at least one of the pixels.

13. The device according to claim 11, wherein a surface area of the display surface is greater than that of the image receiving surface.

14. The device according to claim 11, wherein the 4-color sub-pixels are arranged in a 2×2 quad form, wherein the first sub pixel is an R (red) sub-pixel, the second sub-pixel is a G (green) sub-pixel, the third sub-pixel is a B (blue) sub-pixel, and the fourth sub-pixel is one of a W (white) sub-pixel or a Y (yellow) sub-pixel.

15. The device according to claim 11, wherein the plurality of regions include a central region and an edge region, and an aperture ratio of the pixels in the central region is smaller than an aperture ratio of the pixels in the edge region.

16. The device according to claim 15, wherein the circular aperture of the black matrix film corresponding to the central region is smaller than the circular aperture of the black matrix film corresponding to the edge region.

17. The device according to claim 15, wherein the black matrix along the boundaries of the sub-pixels in the central region is wider than the black matrix along the boundaries of the sub-pixels in the edge region.

18. The device according to claim 15, wherein the black matrix at the boundary of one of the 4-color sub-pixels in the central region is wider than the black matrix at the boundary of the same-colored sub-pixel in the edge region.

19. The device according to claim 18, wherein the one of the 4-color sub-pixels is one of a W (white) sub-pixel and a Y (yellow) sub-pixel.

20. The device according to claim 15, wherein the aperture ratio of the pixels in the image display part is the smallest at the central region and gradually increases toward the edge region.

21. The device according to claim 20, wherein the size of the circular apertures of the black matrix is the smallest at the central region and gradually increases toward the edge region.

22. The device according to claim 20, wherein the width of the black matrix at the boundaries of the sub-pixels is the smallest at the central region and gradually increases toward the edge region.

23. The device according to claim 20, wherein the width of the black matrix at the boundary of one of the 4-color sub-pixels is the smallest at the central region and gradually increases toward the edge region.

24. The device according to claim 23, wherein the one of the 4-color sub-pixels is one of a W (white) sub-pixel and a Y (yellow) sub-pixel.

25. The device according to claim 11, wherein the display panel is a liquid crystal panel.

26. The device according to claim 25, wherein the liquid crystal panel includes:

first and second substrates;

gate lines and data lines arranged on the first substrate and defining the sub-pixels;

a pixel electrode formed at each of the sub-pixels;

a switching device disposed at each intersection of the gate lines and the data lines and switching the corresponding one of the sub-pixels;

a color filter formed on the second substrate;

a common electrode formed on the color filter; and a liquid crystal layer formed on the first and second substrates.

27. The device according to claim 25, wherein the liquid crystal panel includes:

first and second substrates;

gate lines and data lines arranged on the first substrate and defining the sub-pixels;

a pixel electrode and a common electrode formed at each of the sub-pixels and generating an electric field;

a switching device disposed at each intersection of the gate lines and the data lines and switching the corresponding one of the sub-pixels;

a color filter formed on the first substrate; and a liquid crystal layer formed between the first and second substrates.

* * * * *